(12) United States Patent
Iriguchi et al.

(10) Patent No.: US 10,831,178 B2
(45) Date of Patent: Nov. 10, 2020

(54) PROCESSING STEP DATA GENERATING APPARATUS AND METHOD

(71) Applicant: Mitsubishi Electric Corporation, Chiyoda-ku (JP)

(72) Inventors: Kenji Iriguchi, Tokyo (JP); Susumu Matsubara, Tokyo (JP); Hiroki Kaneko, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 107 days.

(21) Appl. No.: 15/758,799

(22) PCT Filed: Oct. 14, 2016

(86) PCT No.: PCT/JP2016/080531
§ 371 (c)(1),
(2) Date: Mar. 9, 2018

(87) PCT Pub. No.: WO2017/069054
PCT Pub. Date: Apr. 27, 2017

(65) Prior Publication Data
US 2019/0064776 A1     Feb. 28, 2019

(30) Foreign Application Priority Data
Oct. 22, 2015   (JP) ................................ 2015-208070

(51) Int. Cl.
*G05B 19/4093*     (2006.01)
(52) U.S. Cl.
CPC ... *G05B 19/40935* (2013.01); *G05B 19/4093* (2013.01); *G05B 2219/35086* (2013.01); *G05B 2219/36307* (2013.01); *Y02P 90/265* (2015.11)
(58) Field of Classification Search
CPC .... G05B 19/40935; G05B 2219/35086; G05B 19/4093; G05B 2219/36307; Y02P 90/265
(Continued)

(56) References Cited

U.S. PATENT DOCUMENTS 4,739,488 A * 4/1988 Asakura ........... G05B 19/40938
                                                          483/5
5,253,346 A * 10/1993 Okabayashi ...... G06F 15/17375
                                                          709/218
(Continued)

FOREIGN PATENT DOCUMENTS

DE   10 2004 016 124 A1   10/2004
DE   10 2004 033 098 A1    3/2005
(Continued)

OTHER PUBLICATIONS

International Search Report dated Dec. 27, 2016 in PCT/JP2016/080531, filed on Oct. 14, 2016.
(Continued)

*Primary Examiner* — Kenneth M Lo
*Assistant Examiner* — Michael W Choi
(74) *Attorney, Agent, or Firm* — Xsensus LLP

(57) ABSTRACT

A processing step data generating apparatus includes: a processing procedure data group storage unit that stores a plurality of pieces of processing procedure data each including data defining a processing unit, which is a unit of a processing step, and processing order data of the processing unit defined by the data defining the processing unit; a processing procedure selection unit; and a processing step generation unit that determines a processing shape for the processing unit on the basis of the data defining the processing unit included in the processing procedure data selected by the processing procedure selection unit as well as product and material data to generate processing unit data, and generates processing step data from the processing unit data being generated.

19 Claims, 17 Drawing Sheets

(58) Field of Classification Search
USPC ........................................................ 700/160
See application file for complete search history.

(56) References Cited

U.S. PATENT DOCUMENTS

| | | | |
|---|---|---|---|
| 6,772,038 B2 | 8/2004 | Kadono | |
| 6,957,123 B2 | 10/2005 | Nakamura | |
| 7,027,889 B2 | 4/2006 | Nakamura | |
| 2003/0023341 A1* | 1/2003 | Sagawa | G05B 19/4093 700/159 |
| 2004/0204786 A1 | 10/2004 | Nakamura | |
| 2005/0010327 A1 | 1/2005 | Nakamura | |
| 2009/0228130 A1* | 9/2009 | Fujino | G05B 19/4097 700/103 |
| 2013/0253693 A1* | 9/2013 | Matsubara | G05B 19/4093 700/159 |
| 2014/0031970 A1* | 1/2014 | Matsubara | G05B 19/40931 700/161 |

FOREIGN PATENT DOCUMENTS

| | | |
|---|---|---|
| EP | 1 217 482 A2 | 6/2002 |
| JP | 03-171205 A | 7/1991 |
| JP | 10-058280 A | 3/1998 |
| JP | 2002-189510 A | 7/2002 |
| JP | 2009-274160 A | 11/2009 |

OTHER PUBLICATIONS

Office Action dated Nov. 27, 2018 in German Patent Application No. 112016004850.5, citing documents AO-AQ and AX therein, 16 pages (with English translation).

Weck, M. et al. Werkzeugmaschinen 4, Automatisierung von Maschinen und Anlagen Springer Vieweg, vol. 6, 2006, pp. 170-182 and Cover Pages (with partial English translation).

Weck, M. et al. Werkzeugmaschinen 4, Automatisierung von Maschinen und Anlagen Springer Vieweg, vol. 6, 2006, pp. 151-165 and Cover Page (with partial English translation).

* cited by examiner

PROCESSING PROCEDURE NAME    : SOLID SHAFT 1
PRODUCT OUTER DIAMETER/DIMENSION : D100mm, L150mm
MATERIAL TYPE                : A5052

| # | PROCESSING METHOD | TOOL USED | PROCESSING CONDITION | UNCUT CONDITION |
|---|---|---|---|---|
| 1 | END FACE TURNING | END FACE TURNING 1 | CONDITION 1 | MINIMUM UNCUT AREA |
| 2 | OUTER DIAMETER TURNING (Z-) | OUTER DIAMETER TURNING 1 | CONDITION 2 | RECESS WIDTH OF w OR LARGER: MINIMUM UNCUT AREA, RECESS WIDTH OF SMALLER THAN w: ALL UNCUT |
| 3 | OUTER DIAMETER TURNING (Z+) | OUTER DIAMETER TURNING 1 | CONDITION 2 | RECESS WIDTH OF w OR LARGER: MINIMUM UNCUT AREA, RECESS WIDTH OF SMALLER THAN w: ALL UNCUT |
| 4 | OUTER DIAMETER GROOVING | OUTER DIAMETER GTOOVING 1 | CONDITION 3 | MINIMUM UNCUT AREA |

PROCESSING PROCEDURE LIST

PRODUCT AND MATERIAL DATA
PRODUCT OUTER DIAMETER/DIMENSION : D93mm, L90mm
MATERIAL TYPE : A5052

| PROCESSING PROCEDURE NAME | MATERIAL TYPE | PRODUCT DIMENSION D | PRODUCT DIMENSION L |
|---|---|---|---|
| SOLID SHAFT 1 | A5052 | 100mm | 150mm |
| SOLID SHAFT 2 | A5052 | 120mm | 60mm |
| SOLID SHAFT 3 | S45C | 300mm | 100mm |
| HOLLOW SHAFT 1 | SUS304 | 50mm | 200mm |
| HOLLOW SHAFT 2 | A5052 | 90mm | 120mm |
| HOLLOW SHAFT 1 | S45C | 100mm | 100mm |

PROCESSING PROCEDURE NAME : SOLID SHAFT 1
PRODUCT OUTER DIAMETER/DIMENSION : D100mm, L150mm
MATERIAL TYPE : A5052

| # | PROCESSING METHOD | TOOL USED | PROCESSING CONDITION | UNCUT CONDITION |
|---|---|---|---|---|
| 1 | END FACE TURNING | END FACE TURNING 1 | CONDITION 1 | MINIMUM UNCUT AREA |
| 2 | OUTER DIAMETER TURNING (Z-) | OUTER DIAMETER TURNING 2 | CONDITION 4 | RECESS WITH UNCUT AREA: ALL UNCUT |
| 3 | OUTER DIAMETER TURNING (Z-) | OUTER DIAMETER TURNING 1 | CONDITION 2 | RECESS WIDTH OF w OR LARGER: MINIMUM UNCUT AREA, RECESS WIDTH OF SMALLER THAN w: ALL UNCUT |
| 4 | OUTER DIAMETER TURNING (Z+) | OUTER DIAMETER TURNING 1 | CONDITION 2 | RECESS WIDTH OF w OR LARGER: MINIMUM UNCUT AREA, RECESS WIDTH OF SMALLER THAN w: ALL UNCUT |
| 5 | OUTER DIAMETER GROOVING | OUTER DIAMETER GROOVING 1 | CONDITION 3 | MINIMUM UNCUT AREA |

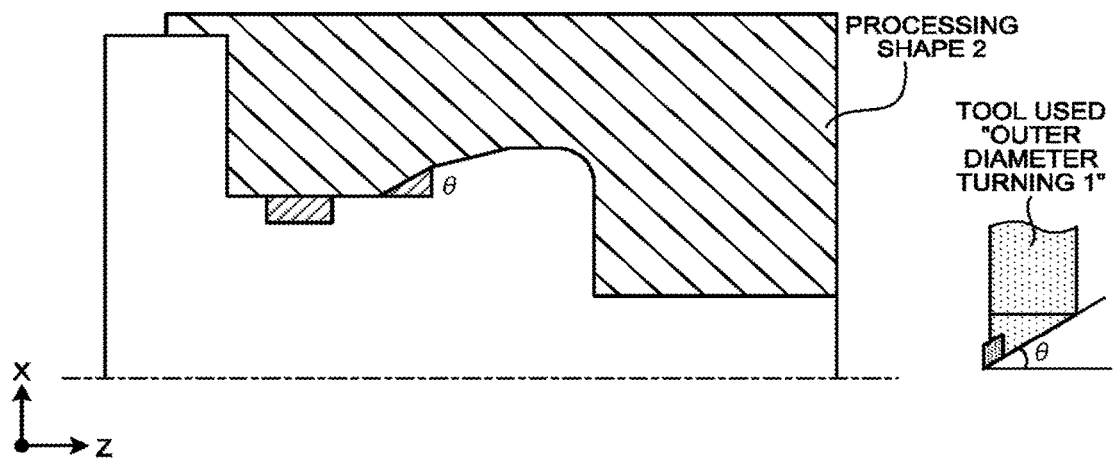

PROCESSING STEP DATA GENERATING APPARATUS AND METHOD

FIELD

The present invention relates to processing step data generating apparatus and method that generate processing step data for removal processing in which a product is obtained from a material on the basis of product and material data.

BACKGROUND

A conventional technique disclosed in Patent Literature 1 generates processing step data for removing a difference between a material and a product on the basis of product and material data. Another conventional processing step data generating apparatus can automatically set a processing step and a processing area for each processing step on the basis of feature data on the shape of a product. Yet another conventional processing step data generating apparatus can refer to past processing step data for each processing step with a fixed processing area.

CITATION LIST

Patent Literature

Patent Literature 1: Japanese Patent Application Laid-open No. 2002-189510

SUMMARY

Technical Problem

The conventional techniques set the processing step and the processing area automatically on the basis of the feature data on the shape recognized from the product and material data. Thus, in order to reflect know-how of an operator about the setting of the processing step and the processing area in the processing step, the processing step set automatically needs to be checked and corrected where necessary. The conventional techniques thus require time and effort for the checking and correcting and are not an efficient method to obtain the processing step reflecting the know-how of the operator about the setting of the processing step and the processing area. The conventional techniques can increase the efficiency of setting detailed information of the processing step such as a tool being used and a processing condition by allowing reference to the past processing step data for each processing step with the fixed processing area, but cannot increase the efficiency of the setting of the processing step and the processing area which take over the know-how of the operator.

The present invention has been made in view of the above problems, and it is an object of the present invention to provide a processing step data generating apparatus that can efficiently generate processing step data reflecting the know-how of an operator about setting of a processing step and a processing area.

Solution to Problem

To solve the problems and achieve the object, the present invention provides a processing step data generating apparatus that generates processing step data for removal processing in which a product is obtained from a material on the basis of product and material data including shape data that represents the shape of each of the product and the material. The processing step data generating apparatus includes: a processing procedure data group storage unit that stores a plurality of pieces of processing procedure data each including data that defines a processing unit, which is a unit of a processing step, as well as processing order data of the processing unit defined by the data defining the processing unit, the data defining the processing unit including a processing method, data on a tool used, and uncut condition data; a processing procedure selection unit that selects processing procedure data to be applied to generate the processing step data from among the plurality of processing procedure data stored in the processing procedure data group storage unit; a removed shape data storage unit that stores removed shape data representing the shape of an area to be removed from the material; and a processing step generation unit that generates the removed shape data from the shape data and stores the removed shape data in the removed shape data storage unit, extracts the data defining the processing unit included in the processing procedure data selected by the processing procedure selection unit in the order according to the processing order data of the processing unit defined by the data defining the processing unit, and generates processing shape data of the processing unit from a processing method, data on a tool used, and uncut condition data included in the data defining the processing unit being extracted as well as the removed shape data stored in the removed shape data storage unit, generates data of a shape obtained by removing a processing shape from a removed shape on the basis of the processing shape data being generated and the removed shape data stored in the removed shape data storage unit, and updates data in the removed shape data storage unit with the data being generated, generates processing unit data from the data defining the processing unit being extracted and the processing shape data generated on the basis of the data defining the processing unit, and generates processing step data on the basis of the processing unit data generated for all the data defining the processing unit included in the processing procedure data selected by the processing procedure selection unit.

Advantageous Effects of Invention

The present invention can efficiently generate the processing step data reflecting the know-how of the operator about the setting of the processing step and the processing area.

BRIEF DESCRIPTION OF DRAWINGS

FIG. 7 is a diagram illustrating an example of processing procedure data stored in a processing procedure data group storage unit.

FIG. 8 is a diagram illustrating an example of display of a processing procedure list made up of a plurality of pieces of processing procedure data.

FIG. 17 is a diagram illustrating an example of a result of correcting the processing procedure data in FIG. 7.

FIG. 25 is an image diagram of extracting the processing shape for the second processing unit definition data in the processing procedure data illustrated in FIG. 7.

FIG. 26 is an image diagram of processing step data generated from the processing procedure data of FIG. 7 with respect to the removed shape data illustrated in FIG. 6.

DESCRIPTION OF EMBODIMENTS

Processing step data generating apparatus and method according to an embodiment of the present invention will now be described in detail with reference to the drawings. Note that the present invention is not limited to the embodiment.

Embodiment

Figure 1:
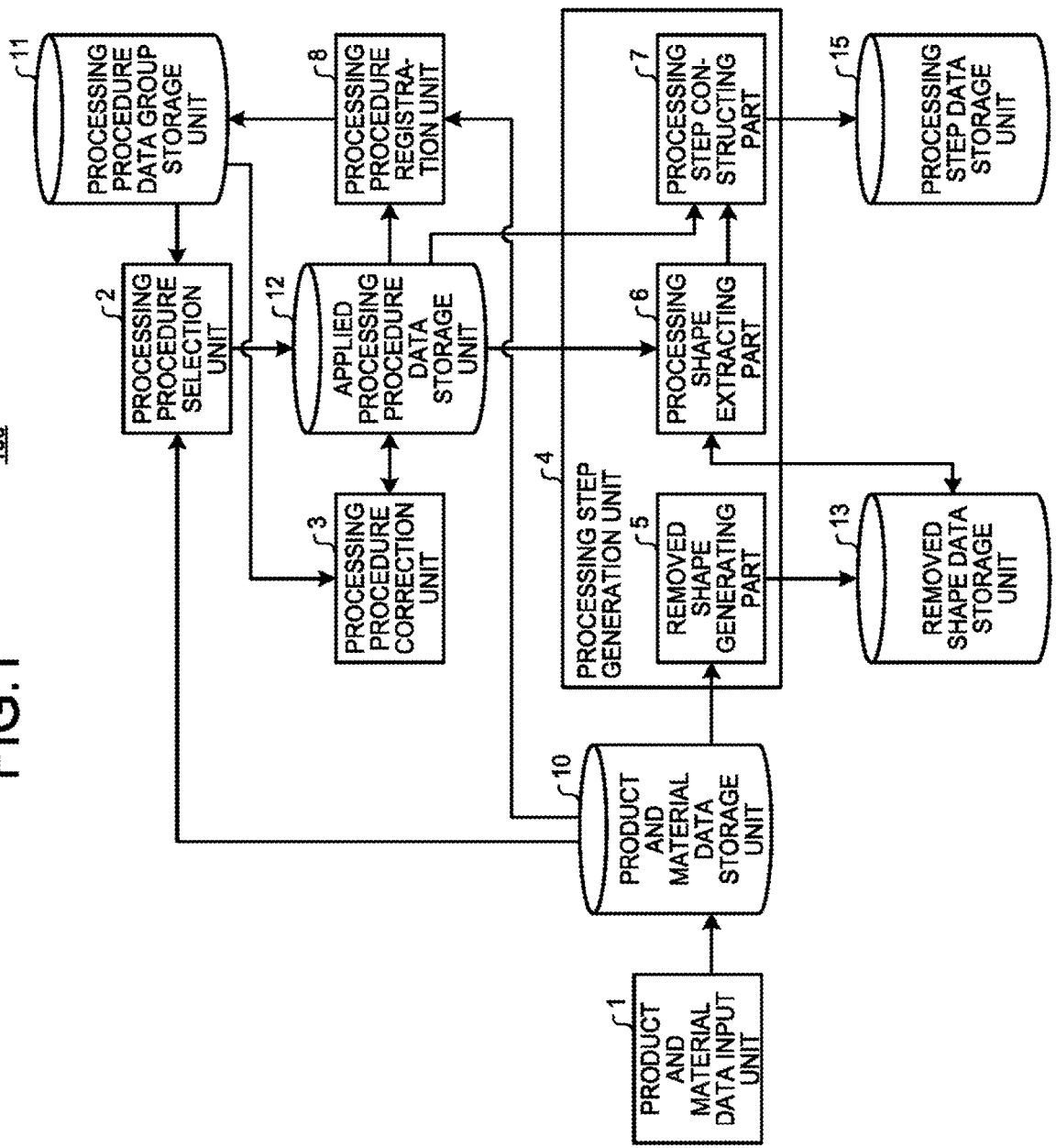
FIG. 1 is a block diagram of a processing step data generating apparatus according to an embodiment of the present invention.

FIG. 1 is a block diagram of a processing step data generating apparatus according to an embodiment of the present invention. A product and material data input unit 1 receives input of product and material data including information on a product shape, a material shape, and a material type from outside. The product and material data input unit 1 stores the product and material data received from outside into a product and material data storage unit 10.

Product shape data and material shape data each include a type, a coordinate, and a dimension of a shape element making up the outline of the product and the material, respectively. The product shape data and the material shape data are each a piece of data such as the type, dimension, and coordinate of the shape of the product and the material input on a keyboard by an operator referring to a drawing, or shape data converted from CAD data.

A processing procedure selection unit 2 selects processing procedure data to be applied to generate processing step data from a processing procedure data group stored in a processing procedure data group storage unit 11, and stores the processing procedure data being selected into an applied processing procedure data storage unit 12.

The processing procedure selection unit 2 further displays, on a display not illustrated, both a piece of data included in each of the plurality of processing procedure data stored in the processing procedure data group storage unit 11 and a value calculated from the data included in each of the plurality of processing procedure data, or displays at least one of the data and the value. The processing procedure selection unit 2 also selects processing procedure data instructed from outside.

A processing procedure correction unit 3 receives the processing procedure data stored in the applied processing procedure data storage unit 12 to correct the processing procedure data received in accordance with an instruction from an operator and update the data in the applied processing procedure data storage unit 12 with the corrected data.

A processing step generation unit 4 includes a removed shape generating part 5, a processing shape extracting part 6, and a processing step constructing part 7. The processing step generation unit 4 generates and stores processing step data by controlling the order of execution of the removed shape generating part 5, the processing shape extracting part 6, and the processing step constructing part 7.

Upon receiving an execution instruction output from the processing step generation unit 4, the removed shape generating part 5 generates removed shape data representing a difference between the product shape and the material shape, on the basis of the product shape data and the material shape data stored in the product and material data storage unit 10. The removed shape generating part 5 stores the removed shape data being generated into a removed shape data storage unit 13.

Upon receiving an execution instruction output from the processing step generation unit 4, the processing shape extracting part 6 generates processing shape data on the basis of the removed shape data stored in the removed shape data storage unit 13 and data defining a processing unit that is included in the processing procedure data stored in the applied processing procedure data storage unit 12. The processing procedure data including the data defining the processing unit will be described later.

On the basis of the removed shape data stored in the removed shape data storage unit 13 and the processing shape data being generated, the processing shape extracting part 6 generates data of a shape obtained by removing the processing shape from the removed shape and updates the data in the removed shape data storage unit 13 with the data being generated.

Upon receiving an execution instruction output from the processing step generation unit 4, the processing step constructing part 7 generates processing unit data on the basis of the data defining the processing unit that is included in the processing procedure data stored in the applied processing procedure data storage unit 12, and the processing shape data generated for the data defining the processing unit by the processing shape extracting part 6, thereby putting together the processing unit data being generated to generate the processing step data. The processing step constructing part 7 stores the processing step data being generated into a processing step data storage unit 15.

In response to an instruction from an operator, a processing procedure registration unit 8 stores the processing procedure data stored in the applied processing procedure data storage unit 12 into the processing procedure data group storage unit 11.

The product and material data storage unit 10 stores the product shape data, the material shape data, and the material type data input to the product and material data input unit 1.

The processing procedure data group storage unit 11 stores processing procedure data prepared in advance and the processing procedure data from the processing procedure registration unit 8.

The applied processing procedure data storage unit 12 stores the processing procedure data selected by the processing procedure selection unit 2 as well as the processing procedure data corrected by the processing procedure correction unit 3.

The removed shape data storage unit 13 stores the removed shape data generated by the removed shape generating part 5. The removed shape data stored in the removed shape data storage unit 13 is updated to the removed shape data which is generated by the processing shape extracting part 6 and from which the processing shape is removed.

The processing step data storage unit 15 stores the processing step data generated by the processing step constructing part 7.

Figure 2:
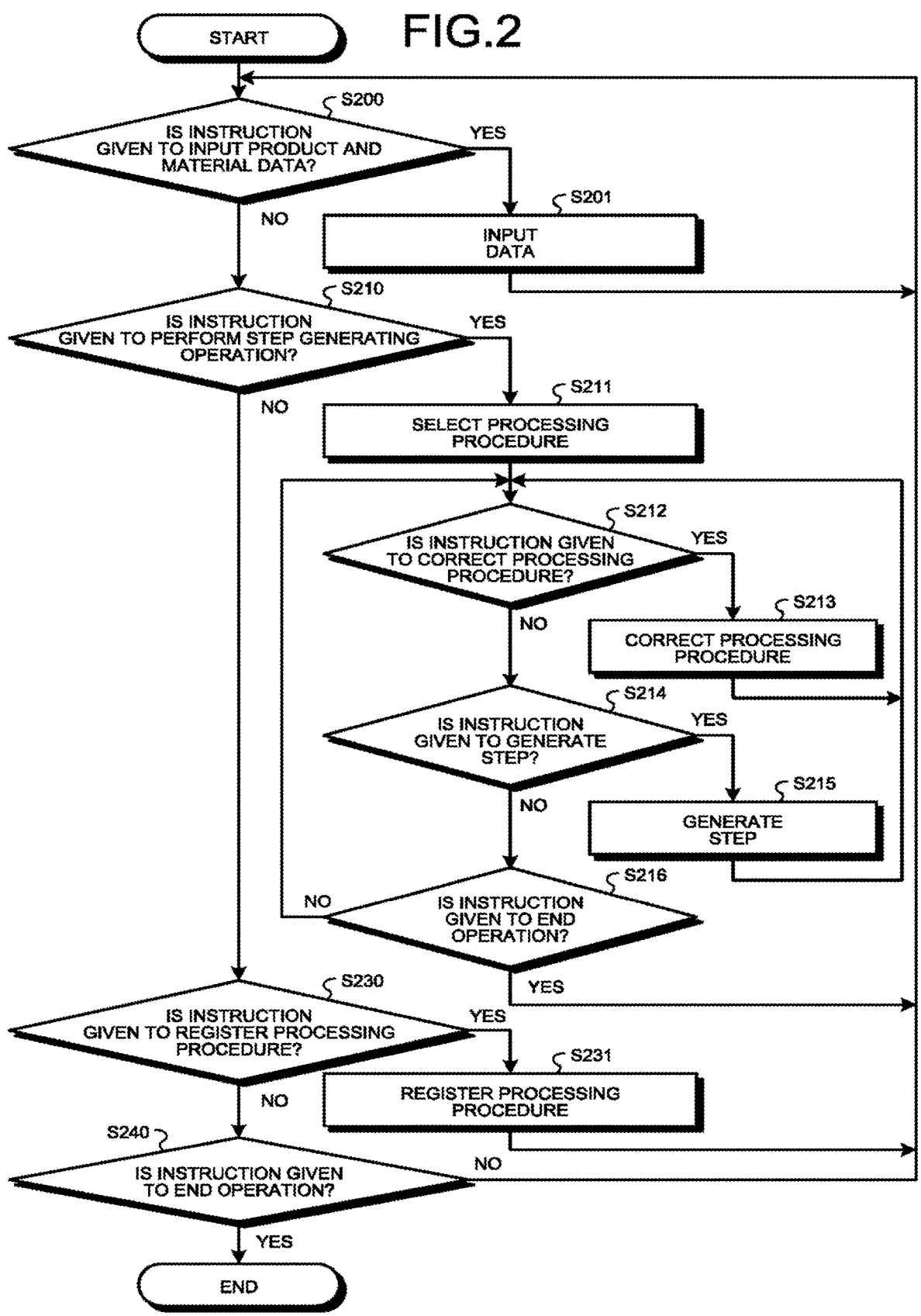
FIG. 2 is a flowchart illustrating the flow of operations performed by the processing step data generating apparatus according to the embodiment of the present invention.

A processing step data generating apparatus 100 configured as described above operates according to a flowchart illustrated in FIG. 2.

FIG. 2 is a flowchart illustrating the flow of operations performed by the processing step data generating apparatus according to the embodiment of the present invention. In step 200, the product and material data input unit 1 checks for an operator's instruction as to whether or not to receive input of product and material data, and executes the process of step 201 if the instruction to receive input of the data is given (Yes in S200) or executes the process of step 210 if the instruction to receive input of the data is not given (No in S200).

In step 201, the product and material data is externally input to the product and material data input unit 1, which then stores the product and material data into the product and material data storage unit 10.

The content of the product and material data will be described in detail with reference to FIGS. 3 and 4.

Figure 3:
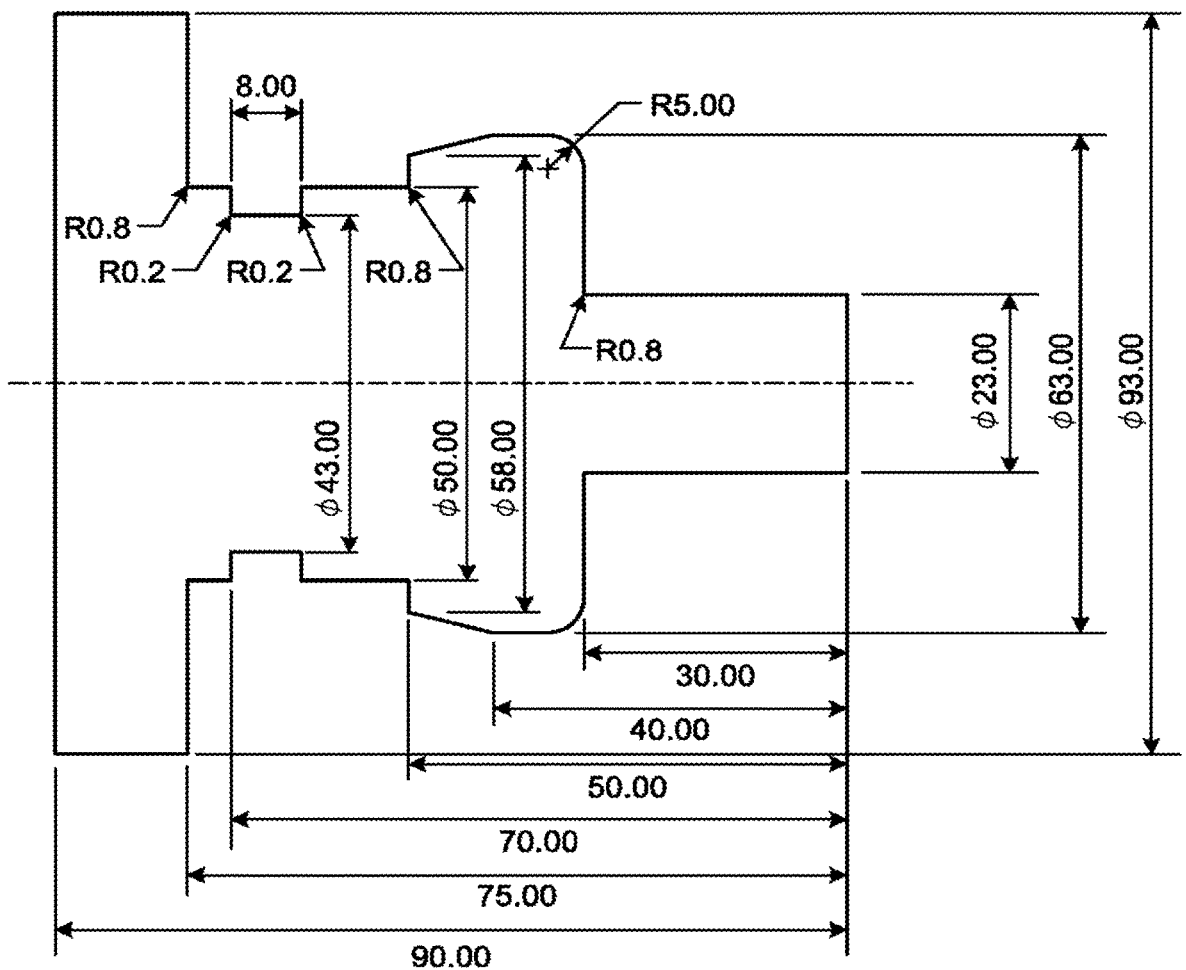
FIG. 3 is a diagram illustrating an example of CAD data from which data is converted at the time of inputting data that defines the shape of a product processed by a turning machine.
Figure 4:
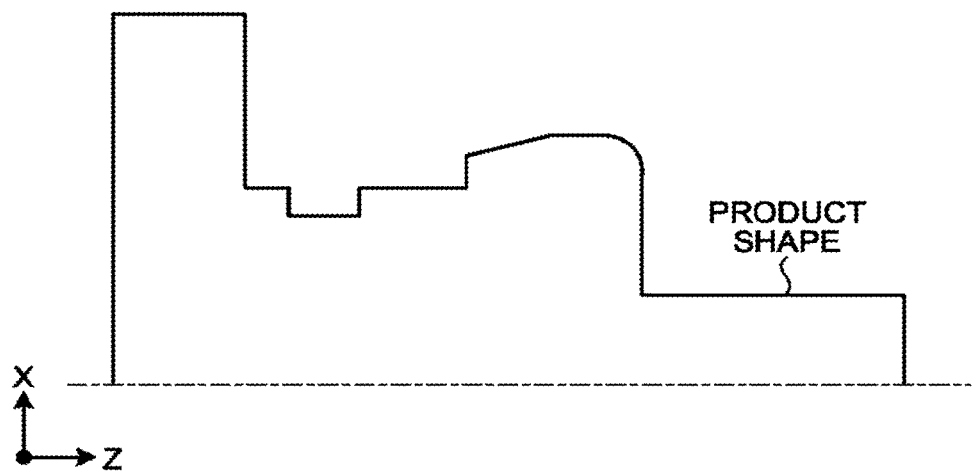
FIG. 4 is a diagram illustrating an example of product shape data converted from the CAD data.

FIG. 3 is a diagram illustrating an example of CAD data from which data is converted at the time of inputting data that defines the shape of a product processed by a turning machine. FIG. 4 is a diagram illustrating an example of product shape data converted from the CAD data.

The shape of the product illustrated in FIG. 3 is symmetrical about a central axis. The processing area to be subjected to turning can be defined by a cross-sectional shape on a plane including a turning axis. The product and material data input unit 1 thus receives input of data of the cross-sectional shape on the plane including the turning axis as the product shape data converted from the CAD data, as illustrated in FIG. 4.

Figure 5:
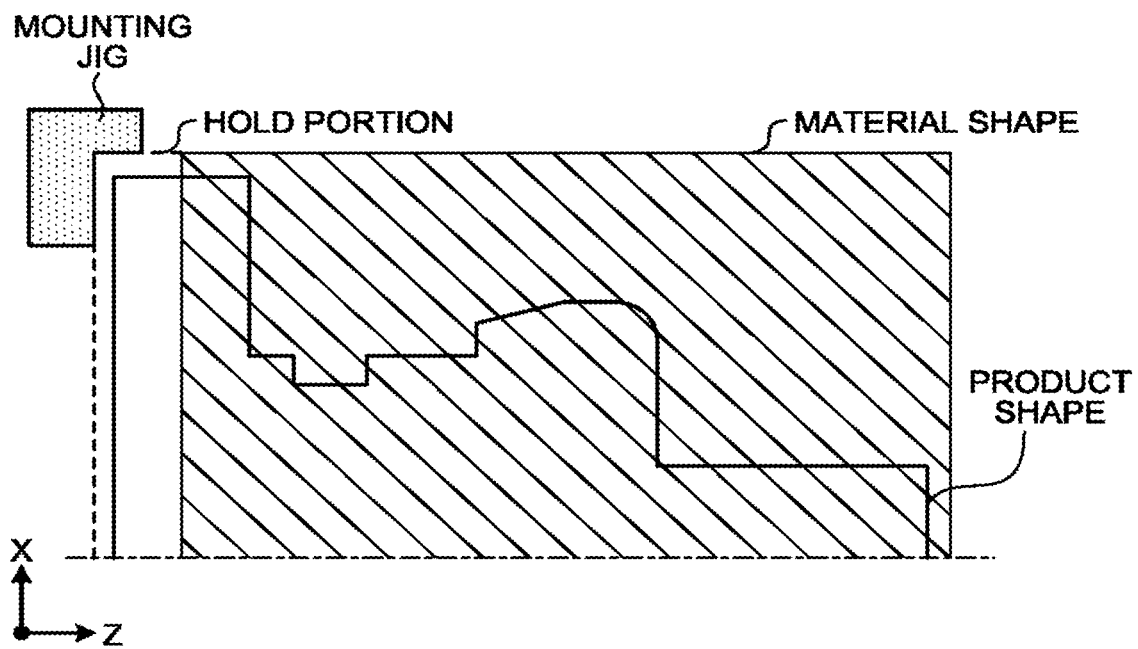
FIG. 5 is a diagram illustrating an example of product and material data stored in a product and material data storage unit.

FIG. 5 is a diagram illustrating an example of the product and material data stored in the product and material data storage unit. The product and material data illustrated in FIG. 5 is obtained by defining material shape data on the product shape data illustrated in FIG. 4. The material shape is defined by the shape of an area that is obtained by excluding, from the material to be processed, a hold portion provided to attach the material to a processing machine. The material shape is cylindrical about the turning axis.

After executing the process of step 201 in FIG. 2, the product and material data input unit 1 executes the process of step 200.

In step 210, the processing procedure selection unit 2 checks for an operator's instruction as to whether or not to perform a step generating operation.

The processing procedure selection unit 2 executes the process of step 211 if instructed to perform the step generating operation (Yes in S210), or executes the process of step 230 if not instructed to perform the step generating operation (No in S210).

Figure 24:
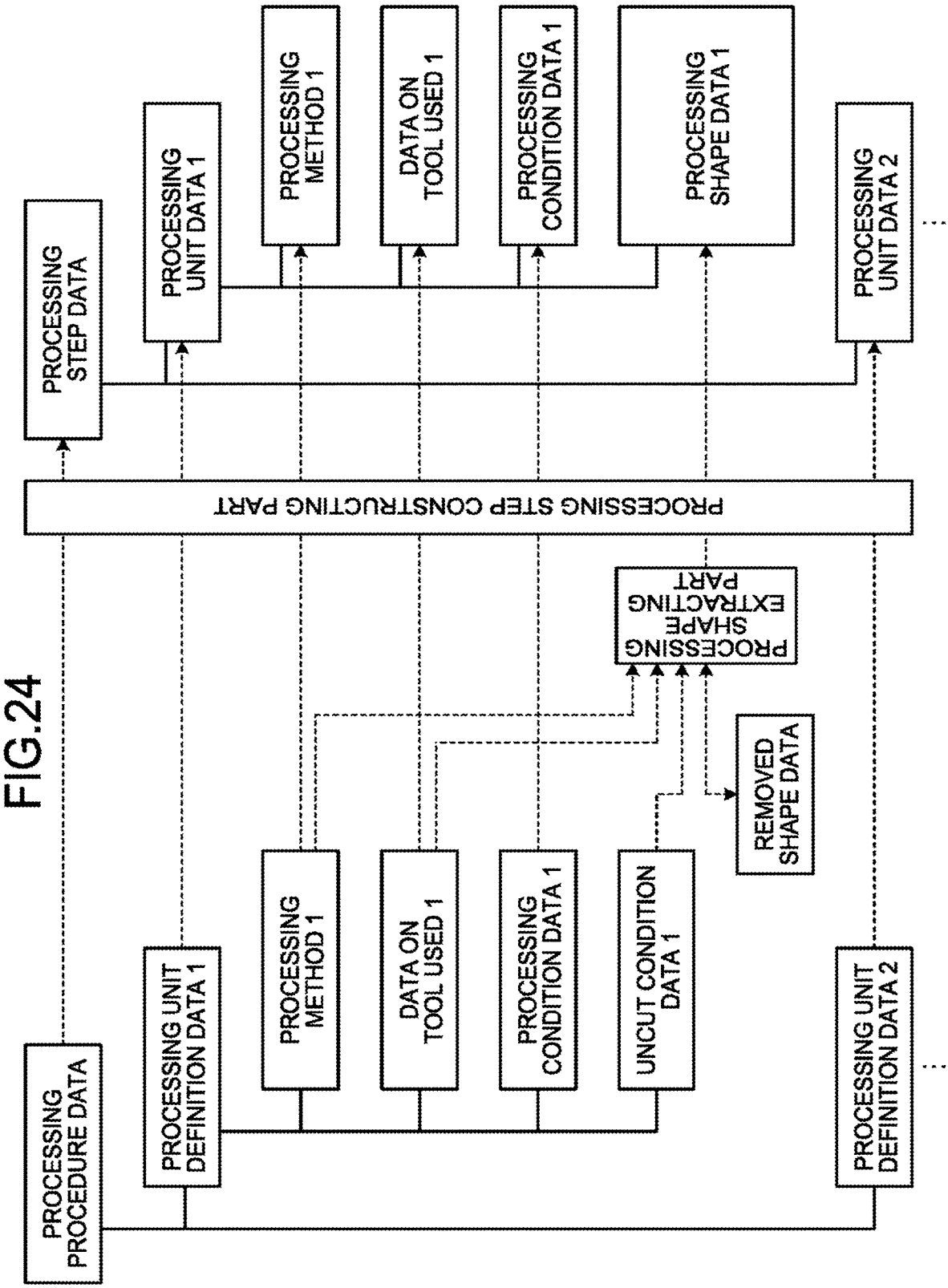
FIG. 24 is a diagram illustrating the configuration of and the relationship between processing procedure data and processing step data.

There will now be described the relationship between the processing procedure data and the processing step data to be generated according to the present embodiment. FIG. 24 is a diagram illustrating the configuration of and the relationship between the processing procedure data and the processing step data. The processing procedure data includes a list of processing unit definition data defining a processing unit which is a unit of a processing step, where the list is arranged in the order of processing of the processing unit defined by the processing unit definition data. The processing unit definition data includes a processing method, data on a tool used, processing condition data, and uncut condition data. The processing step data includes a list of processing unit data arranged in the order of processing. The processing unit data includes a processing method, data on a tool used, processing condition data, and processing shape data representing an area shape to be processed. Processing performed with continued use of one tool is defined by the processing method, the data on a tool used, the processing condition data, and the processing shape data representing the area shape to be processed that are included in the processing unit data.

The processing step data is generated with respect to the processing procedure data, while the processing unit data in the processing step data is generated with respect to the processing unit definition data in the processing procedure data. The processing method, the data on a tool used, and the processing condition data included in the processing unit data are set from the processing method, the data on a tool used, and the processing condition data included in the corresponding processing unit definition data, respectively.

The processing shape data set in the processing unit data is generated from the processing method, the data on a tool used, and the uncut condition data included in the corresponding processing unit definition data as well as the removed shape data.

As described above, the processing procedure data defines the structure of the processing step data to be generated, and thus serves as a template for the processing step data including data on which the processing unit data is based. The processing shape data of the processing unit data is generated from the processing method, the data on a tool used, and the uncut condition data included in the processing unit definition data as well as the removed shape data. As a result, there can be obtained the processing shape data with an uncut area that is properly processed by the tool used from various removed shapes. The processing step data applying the processing procedure data can thus be generated for various combinations of the product shape and the material shape.

In step 211, the processing procedure selection unit 2 selects the processing procedure data to be applied to generate the processing step data from among the data stored in the processing procedure data group storage unit 11. The processing procedure selection unit 2 then stores the selected data into the applied processing procedure data storage unit 12.

Specifically, a list of the processing procedure data stored in the processing procedure data group storage unit 11 is first displayed in step 211.

FIG. 7 is a diagram illustrating an example of the processing procedure data stored in the processing procedure data group storage unit.

Processing procedure data 300 illustrated in FIG. 7 includes processing procedure name data, product outer diameter/dimension data, and material type name data.

The processing procedure name data is data of a name arbitrarily given by an operator's instruction. The product outer diameter/dimension data is data of the outer diameter and dimension of a product into which the material is to be processed in the processing step generated by applying the processing procedure. The material type name data is name data of the type of the material to be processed in the processing step generated by applying the processing procedure.

The processing procedure data 300 includes a list of processing unit definition data, and the processing unit definition data includes data on each of a processing method, a tool used, a processing condition, and an uncut condition.

The processing procedure data 300 illustrated in FIG. 7 includes four kinds of processing methods as an example.

First processing unit definition data includes data on each of a tool used, a processing condition, and an uncut condition when "end face turning" is defined as a processing method.

Second processing unit definition data includes data on each of a tool used, a processing condition, and an uncut condition when "outer diameter turning (Z−)" is defined as a processing method. Here, the part "(Z−)" in the processing method indicates that the material is processed in a Z− direction by the tool.

Third processing unit definition data includes data on each of a tool used, a processing condition, and an uncut condition when "outer diameter turning (Z+)" is defined as a processing method. Here, the part "(Z+)" in the processing method indicates that the material is processed in a Z+ direction by the tool.

Fourth processing unit definition data includes data on each of a tool used, a processing condition, and an uncut condition when "outer diameter grooving" is defined as a processing method.

Figure 22:
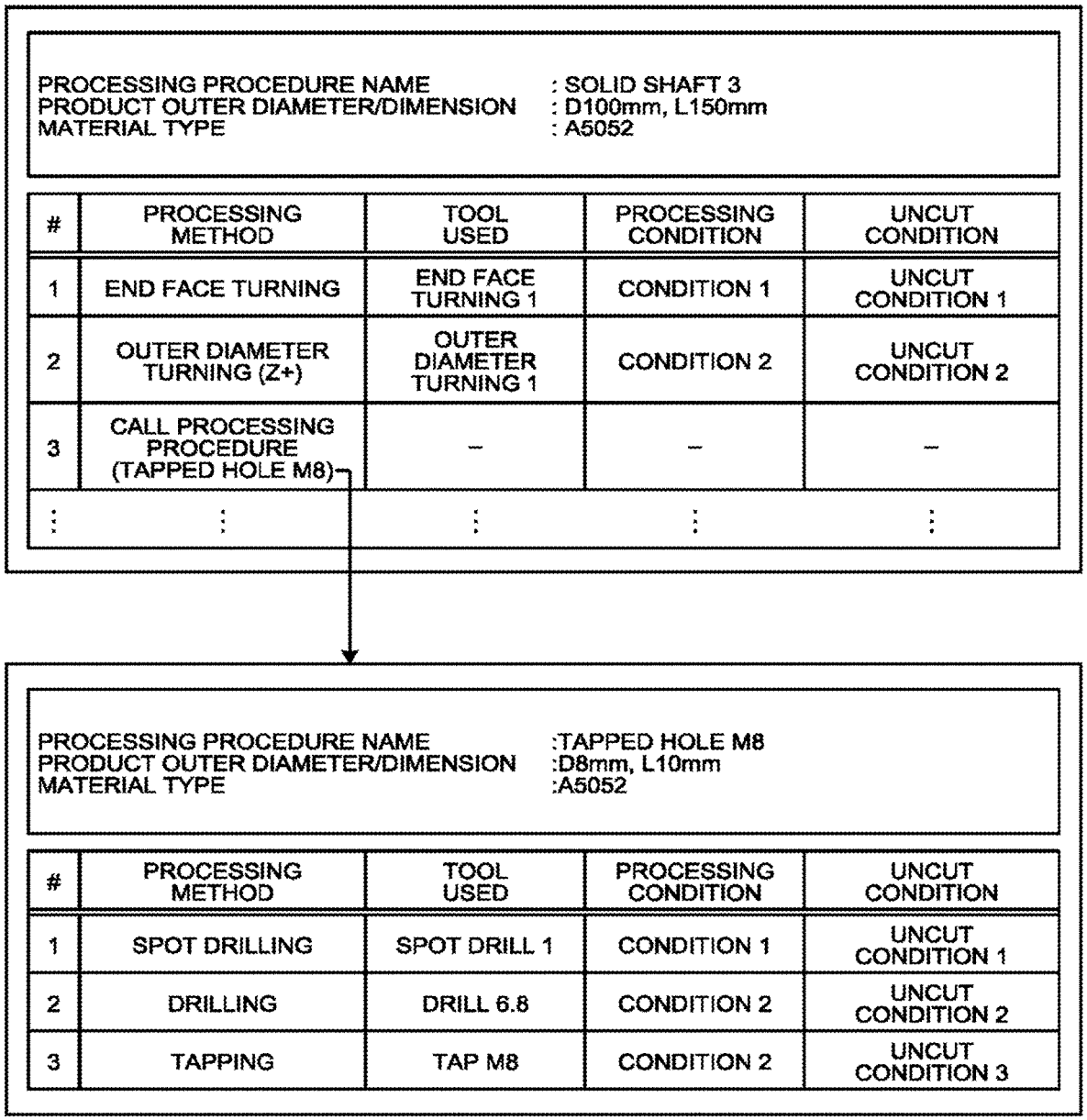
FIG. 22 is a diagram illustrating a variation of the processing procedure data illustrated in FIG. 7.

Note that the processing procedure data 300 can be nested as illustrated in FIG. 22. FIG. 22 is a diagram illustrating a variation of the processing procedure data illustrated in FIG. 7. Processing procedure data 310 illustrated in FIG. 22 includes processing procedure data named "solid shaft 3" and processing procedure data named "tap hole M8". Third processing unit definition data included in the processing procedure data named "solid shaft 3" is the data for calling the processing procedure data named "tap hole M8". The processing procedure data 310 has the nested structure to be able to make the processing procedure data divided into parts and reused, whereby the processing know-how can be applied efficiently.

FIG. 8 is a diagram illustrating an example of display of a processing procedure list made up of a plurality of pieces of processing procedure data. A processing procedure list 400 of FIG. 8 is displayed on a display (not illustrated) by the processing procedure selection unit 2, for example.

An upper part of the processing procedure list 400 displays, as reference data, product outer diameter/dimension data calculated from product shape data stored in the product and material data storage unit 10, and a name of the material type. The product shape data is expressed by the outer diameter and dimension of a product such as the diameter and the length along the central axis of a cylinder containing the shape of the product.

A lower part of the processing procedure list 400 displays a list of the plurality of processing procedure data. FIG. 8 displays the processing procedure name data, the material type name data, and the product outer diameter/dimension data included in the processing procedure data in a single row for each of the processing procedure data stored in the processing procedure data group storage unit 11.

The processing procedure name data displays an arbitrary processing procedure name added at the time of storing the processing procedure data in the processing procedure data group storage unit 11.

On the list of the processing procedure data as illustrated in FIG. 8, an operator selects a row relevant to processing procedure data to be used in generating processing step data this time. The processing procedure selection unit 2 at this time stores a copy of the processing procedure data corresponding to the row being selected into the applied processing procedure data storage unit 12.

The processing procedure list 400 displays the arbitrary processing procedure name added at the time of storing the processing procedure data in the processing procedure data group storage unit 11. As a result, an operator can recognize each of the processing procedure data displayed on the list by the name that is named and easily understood by the operator. Thus, the operator can smoothly make a selection.

The processing procedure list 400 further displays data of the product and material for which the processing step data is generated this time, and data corresponding to the data of the product and material is also displayed for each processing procedure data. As a result, an operator can examine which data to select while comparing the information displayed to thus be able to make a selection smoothly.

The processing procedure list 400 can also display data relevant to the processing procedure data in the order of the outer diameter and dimension of a product closer to those of the product for which the processing step data is generated this time. As a result, an operator can avoid the trouble of having to search for desired processing procedure data from the list.

After step 211, step 212 checks for an operator's instruction as to whether or not to correct the processing procedure data stored in the applied processing procedure data storage unit 12.

The process of step 213 is executed if the instruction to correct the processing procedure data is given (Yes in S212). The process of step 213 will be described later.

The process of step 214 is executed if the instruction to correct the processing procedure data is not given (No in S212).

Step 214 checks for an operator's instruction as to whether or not to generate the processing step on the basis of the processing procedure data stored in the applied processing procedure data storage unit 12 and the data stored in the product and material data storage unit 10. Step 215 is executed if the instruction to generate the processing step is given (Yes in S214), or the process proceeds to step 216 if the instruction to generate the processing step is not given (No in S214).

Step 215 generates the processing step according to the following procedures (A) to (D).

(A) The processing step generation unit 4 gives an execution instruction to the removed shape generating part 5, which then extracts shape data representing the shape of the product and material stored in the product and material data storage unit 10 according to the execution instruction, generates data of the removed shape corresponding to a difference between the product shape and the material shape, and initializes the data in the removed shape data storage unit 13 with the data being generated.

(B) The processing step generation unit 4 extracts the processing procedure data stored in the applied processing procedure data storage unit 12, and gives an execution instruction to the processing shape extracting part 6 and the processing step constructing part 7 for each processing unit definition data included in the processing procedure data being extracted.

(C) In accordance with the execution instruction output from the processing step generation unit 4, the processing shape extracting part 6 generates processing shape data of a processing unit on the basis of the removed shape data stored in the removed shape data storage unit 13 and the processing unit definition data included in the processing procedure data, thereby outputting the processing shape data being generated to the processing step constructing part 7. On the basis of the processing shape data being generated and the removed shape data, the processing shape extracting part 6 also generates data of a shape obtained by removing the processing shape from the removed shape and updates the data in the removed shape data storage unit 13 with the data being generated.

(D) In accordance with the execution instruction output from the processing step generation unit 4, the processing step constructing part 7 generates processing unit data by putting together the data of each of the processing method, the tool used, the processing condition, and the processing shape on the basis of the processing shape data from the processing shape extracting part 6 and the processing unit definition data included in the processing procedure data, thereby generating processing step data by putting together the processing unit data being generated and storing the processing step data into the processing step data storage unit 15.

Figure 6:
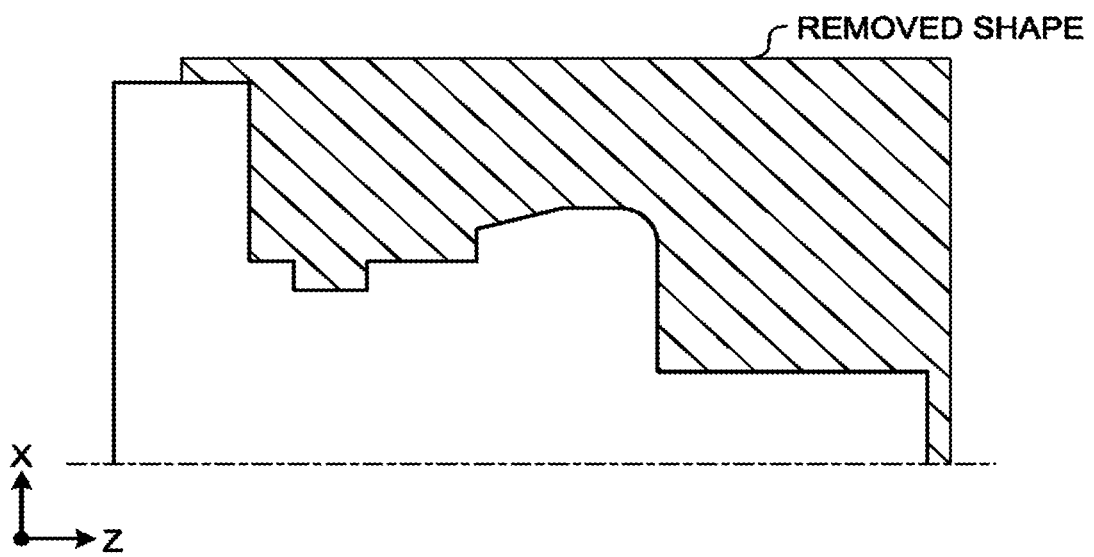
FIG. 6 is a diagram illustrating an example of removed shape data generated in procedure (A).

FIG. 6 is a diagram illustrating an example of the removed shape data generated in procedure (A). When the processing procedure data 300 of FIG. 7 is obtained for the removed shape data illustrated in FIG. 6 from the applied processing procedure data storage unit 12, images of the processing shape data and removed shape data generated in procedure (C) are illustrated in FIGS. 9, 10, 25, 12, 13, 14, 15, and 16.

Figure 9:
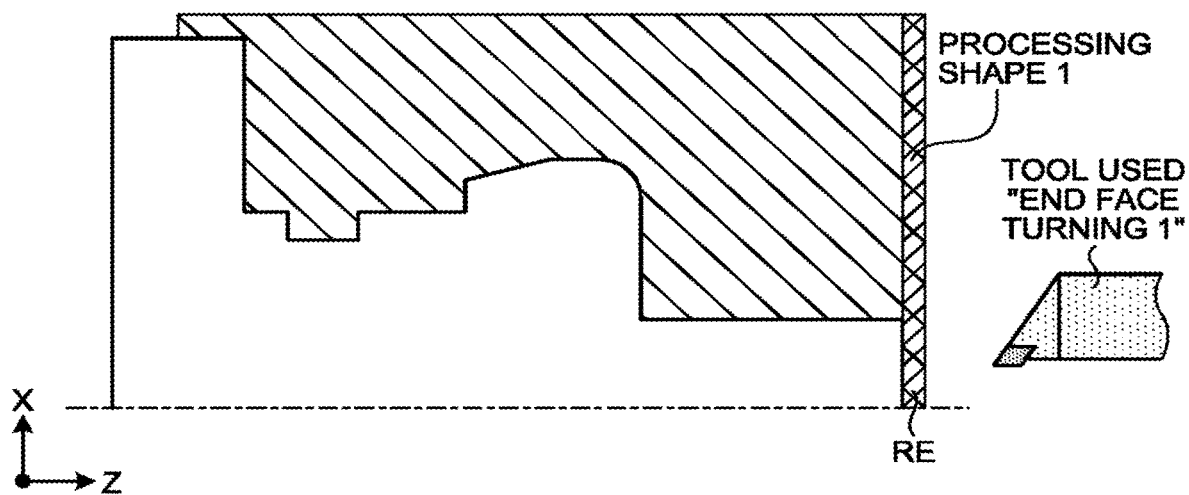
FIG. 9 is an image diagram of a processing shape extracted for first processing unit definition data in the processing procedure data illustrated in FIG. 7.

FIG. 9 is an image diagram of the processing shape extracted for the first processing unit definition data in the processing procedure data illustrated in FIG. 7. The processing shape is extracted by the following procedure on the basis of a processing method "end face turning", a tool used "end face turning 1", and an uncut condition "minimum uncut area" included in the processing unit definition data as well as the removed shape data.

According to the processing method "end face turning", an area shape (RE in FIG. 9) on the Z+ side relative to a plane that is perpendicular to the Z axis and includes the largest Z-axis coordinate in the area of the removed shape corresponding to the product shape is extracted an extraction target area. The orientation of the tool used "end face turning 1" is set as illustrated in FIG. 9.

According to the uncut condition "minimum uncut area", an area shape in the extraction target area that minimizes the uncut area by the tool used "end face turning 1" with the set orientation is extracted as the processing shape (processing shape 1 in FIG. 9).

Figure 10:
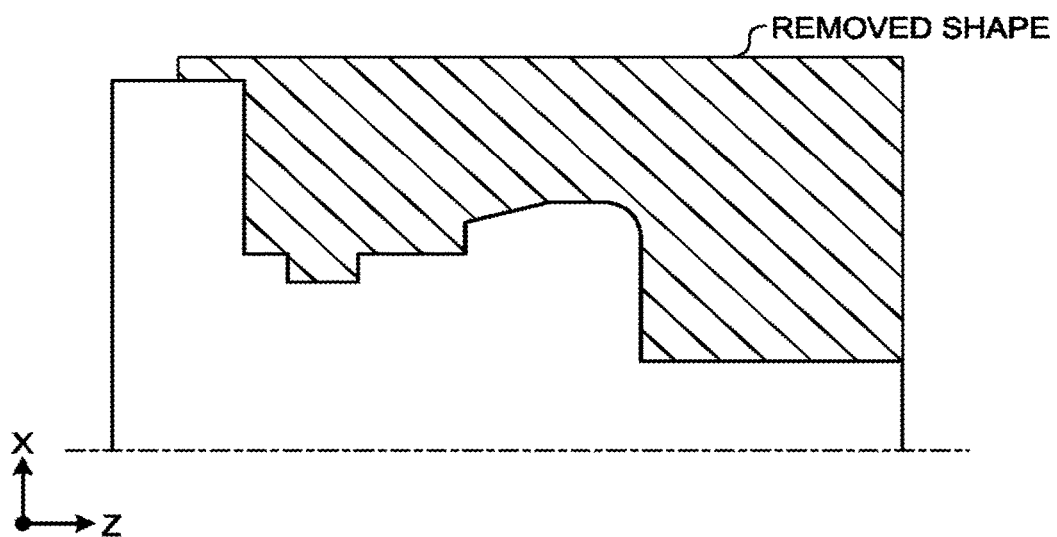
FIG. 10 is an image diagram of a removed shape updated by removing the processing shape illustrated in FIG. 9.

FIG. 10 is an image diagram of a removed shape updated by removing the processing shape illustrated in FIG. 9.

Figure 11:
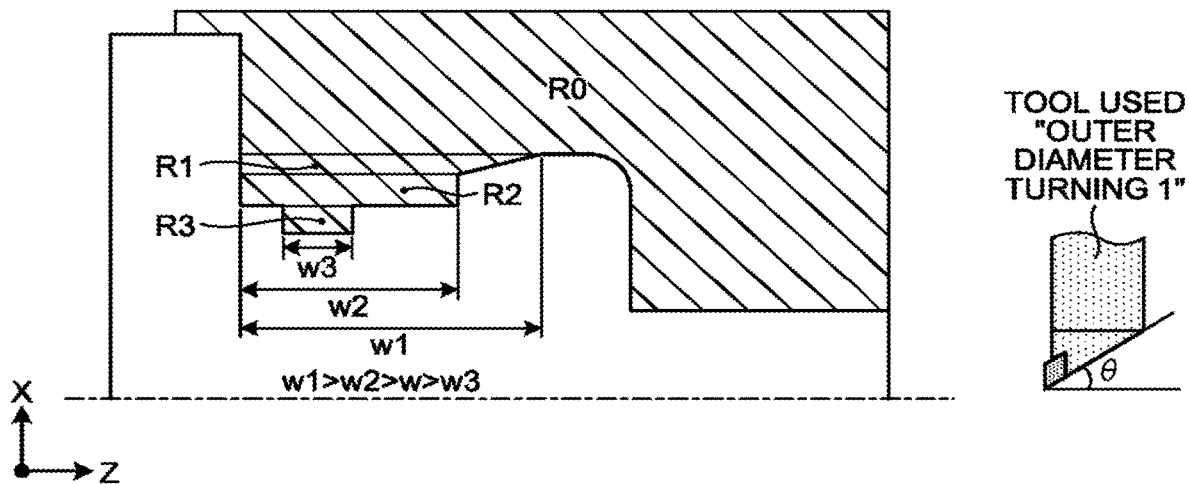
FIG. 11 is an image diagram of extracting a processing shape for second processing unit definition data in the processing procedure data illustrated in FIG. 7.

FIGS. 11 and 25 are each an image diagram of extracting the processing shape for the second processing unit definition data in the processing procedure data illustrated in FIG. 7. The processing shape is extracted by the following procedure on the basis of a processing method "outer diameter turning (Z−)", a tool used "outer diameter turning 1", and an uncut condition "minimum uncut area for the recess width of w or more, and all uncut for the recess width of less than w" included in the processing unit definition data as well as the removed shape data.

According to the processing method "outer diameter turning (Z−)", recesses (R1, R2, and R3 in FIG. 11) that are recessed in the X− direction in an area shape of the removed shape corresponding to the X+ side relative to the area thereof corresponding to the product shape are extracted, and an area shape (R0 in FIG. 11) excluding the recesses in the area shape is extracted as a part of the processing shape. The lengths in the Z direction (w1, w2, and w3 in FIG. 11) are also calculated as the widths of the recesses. The orientation of the tool used "outer diameter turning 1" is set as illustrated in FIG. 11 since the processing is performed in the Z− direction.

According to the uncut condition "minimum uncut area for the recess width of w or more, and all uncut for the recess width of less than w", an area shape in each of the recesses having the widths of w or more (R1 and R2 in FIG. 11) that minimizes the uncut area by the tool used "outer diameter turning 1" with the set orientation is extracted as a part of the processing shape, while the recess having the width of less than w (R3 in FIG. 11) is all left uncut.

The shape of the sum of the area shapes extracted as a part of the processing shape is extracted as a processing shape (processing shape 2 in FIG. 25).

The value of w included in the uncut condition may be held for each uncut condition data in the processing unit definition data or may be shared among the plurality of uncut condition data included in the processing procedure data.

Figure 12:
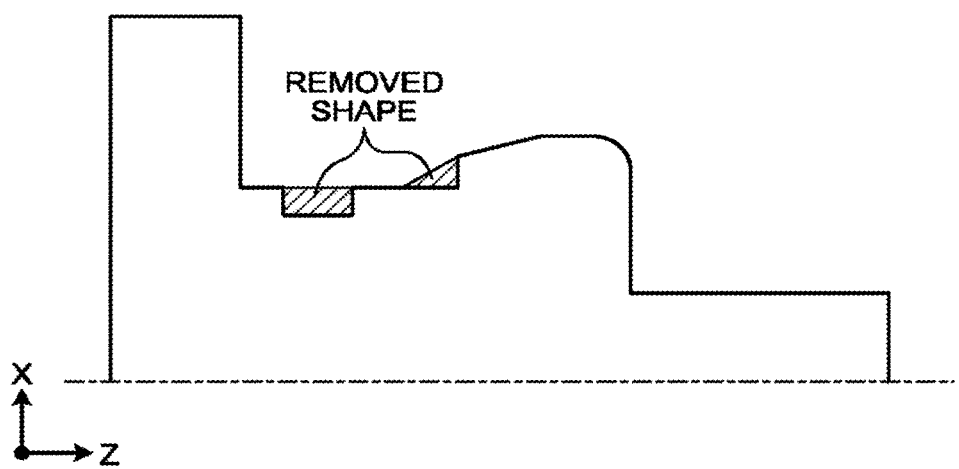
FIG. 12 is an image diagram of a removed shape updated by removing the processing shape illustrated in FIG. 25.

FIG. 12 is an image diagram of a removed shape updated by removing the processing shape of FIG. 25.

Figure 13:
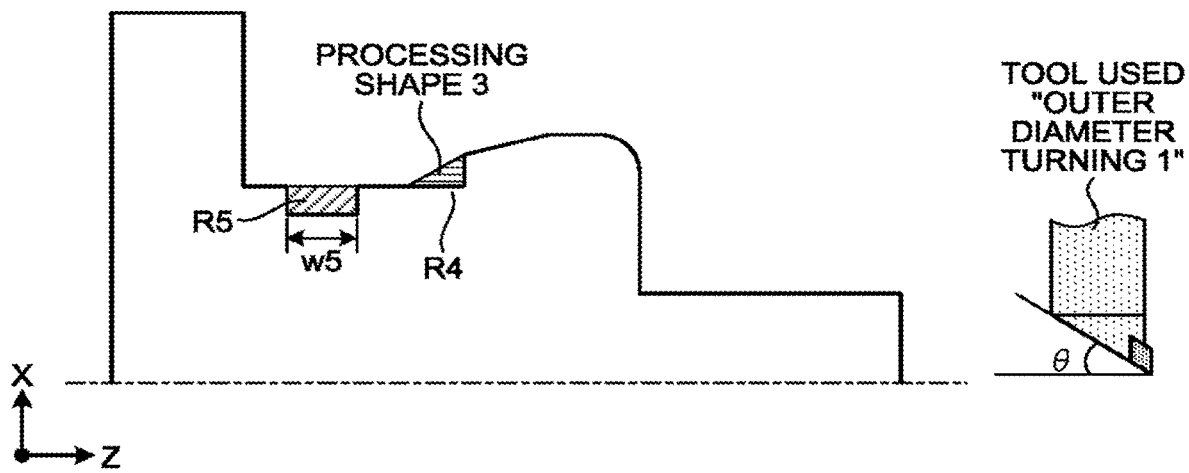
FIG. 13 is an image diagram of a processing shape extracted for third processing unit definition data in the processing procedure data illustrated in FIG. 7.

FIG. 13 is an image diagram of extracting the processing shape for the third processing unit definition data in the processing procedure data illustrated in FIG. 7. The processing shape is extracted by the following procedure on the basis of a processing method "outer diameter turning (Z+)", the tool used "outer diameter turning 1", and the uncut condition "minimum uncut area for the recess width of w or more, and all uncut for the recess width of less than w" included in the processing unit definition data as well as the removed shape data.

According to the processing method "outer diameter turning (Z+)", a recess (R5 in FIG. 13) that is recessed in the X− direction in an area shape of the removed shape corresponding to the X+ side relative to the area thereof corresponding to the product shape is extracted, and an area shape (R4 in FIG. 13) excluding the recess in the area shape is extracted as a part of the processing shape. The length in the Z direction (w5 in FIG. 13) is also calculated as the width of the recess. The orientation of the tool used "outer diameter turning 1" is set as illustrated in FIG. 13 since the processing is performed in the Z+ direction.

According to the uncut condition "minimum uncut area for the recess width of w or more, and all uncut for the recess width of less than w", an area shape in the recess having the width of w or more (no such corresponding area shape in FIG. 13) that minimizes the uncut area by the tool used "outer diameter turning 1" with the set orientation is extracted as a part of the processing shape, while the recess having the width of less than w (R5 in FIG. 13) is all left uncut.

The shape of the sum of the area shapes extracted as a part of the processing shape is extracted as a processing shape (processing shape 3 in FIG. 13).

Figure 14:
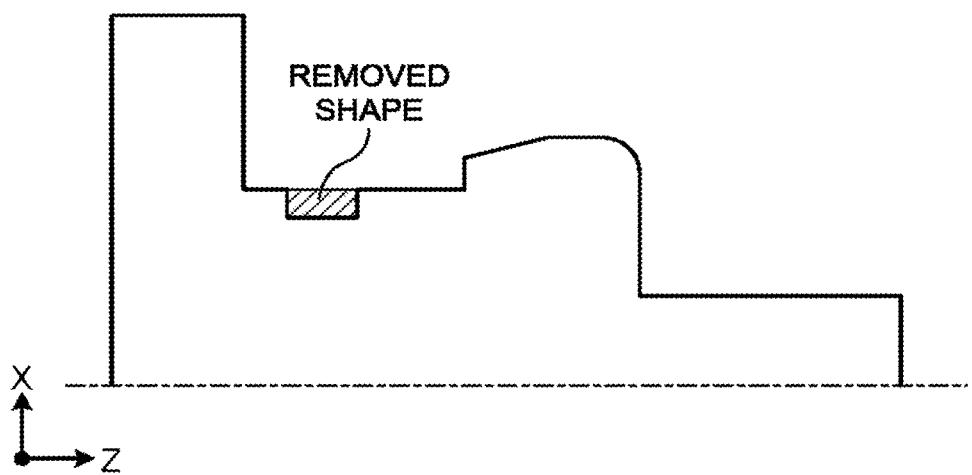
FIG. 14 is an image diagram of a removed shape updated by removing the processing shape illustrated in FIG. 13.

FIG. 14 is an image diagram of a removed shape updated by removing the processing shape of FIG. 13.

Figure 15:
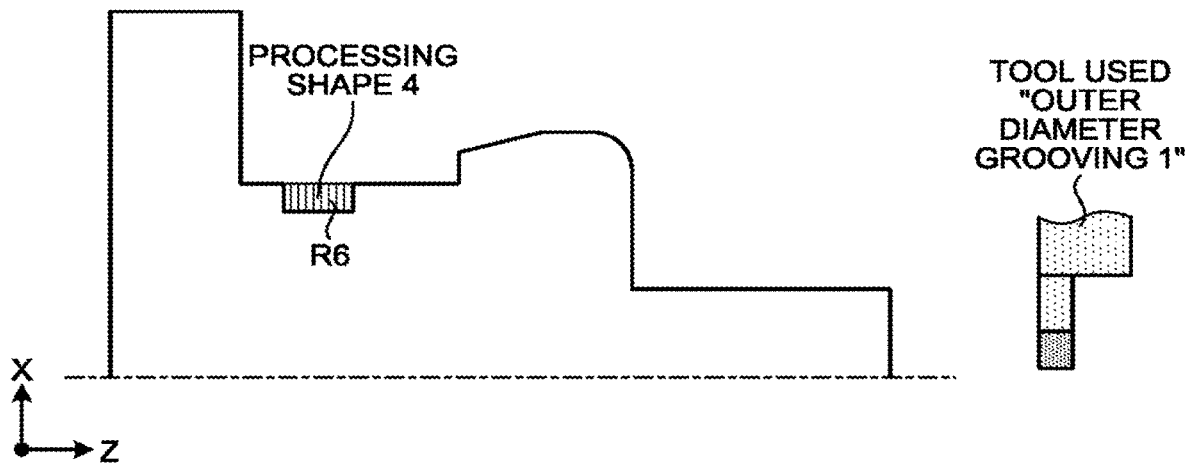
FIG. 15 is an image diagram of a processing shape extracted for fourth processing unit definition data in the processing procedure data illustrated in FIG. 7.

FIG. 15 is an image diagram of the processing shape extracted for the fourth processing unit definition data in the processing procedure data illustrated in FIG. 7. The processing shape is extracted by the following procedure on the basis of a processing method "outer diameter grooving", a tool used "outer diameter grooving 1", and the uncut condition "minimum uncut area" included in the processing unit definition data as well as the removed shape data.

According to the processing method "outer diameter grooving", an area shape (R6 in FIG. 15) of the removed shape corresponding to the X+ side relative to the area thereof corresponding to the product shape is extracted as an extraction target area. The orientation of the tool used "outer diameter grooving 1" is set as illustrated in FIG. 15.

According to the uncut condition "minimum uncut area", an area shape in the extraction target area that minimizes the uncut area by the tool used "outer diameter grooving 1" with the set orientation is extracted as the processing shape (processing shape 4 in FIG. 15).

Figure 16:
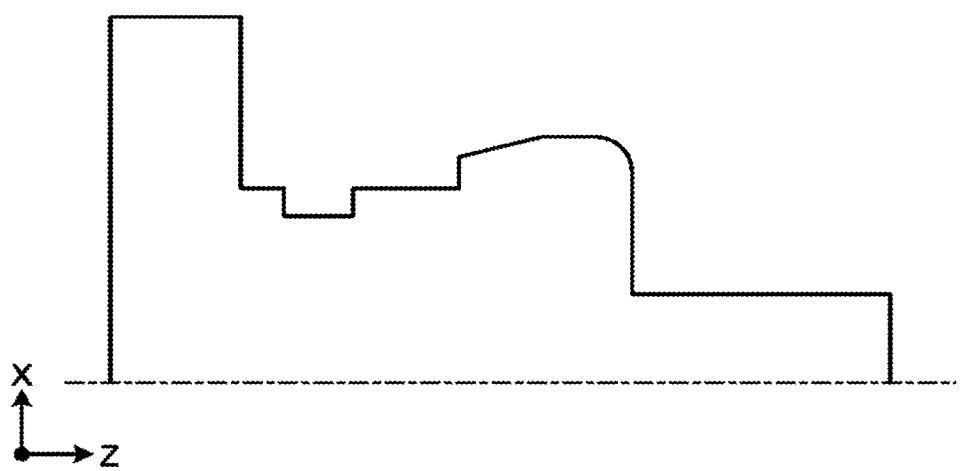
FIG. 16 is an image diagram of a removed shape updated by removing the processing shape illustrated in FIG. 15.

FIG. 16 is an image diagram of a removed shape updated by removing the processing shape of FIG. 15. All the removed shapes are removed in the processing unit for the fourth processing unit definition data. FIG. 26 illustrates the processing step data generated in procedure (D) on the basis of the processing procedure data of FIG. 7 and the processing shape data extracted in the procedure (C) from the removed shape data illustrated in FIG. 6. The processing step data being generated includes a list of the processing unit data arranged in the order of processing, where the processing unit data in the list is generated for the processing unit definition data having the processing shape among the processing unit definition data in the processing procedure data on which the processing unit data is based. The processing method, the tool used, and the processing condition in the processing unit data store the same data as the data of the processing method, the tool used, and the processing condition in the corresponding processing unit definition data, and the processing shape in the processing unit data stores the data generated from the corresponding processing unit definition data and the removed shape data.

The process returns to step 212 after the process of step 215.

The process of step 213 will now be described.

In step 213, the processing procedure correction unit 3 acquires the processing procedure data stored in the applied processing procedure data storage unit 12 to correct, add, and/or delete the processing unit definition data included in the processing procedure data being acquired in accordance with an operator's instruction. The processing procedure correction unit 3 updates the data in the applied processing procedure data storage unit 12 with the corrected data.

The correction work can be performed efficiently by searching for and referring to the processing unit definition data in the processing procedure data stored in the processing procedure data group storage unit 11 and the applied processing procedure data storage unit 12.

FIG. 17 is a diagram illustrating an example of a result of correcting the processing procedure data of FIG. 7. Processing procedure data 320 of FIG. 17 is obtained by adding the second processing unit definition data to the processing procedure data 300 of FIG. 7.

The processing unit definition data being added indicates the use of a tool and a processing condition that enable outer diameter turning in a shorter time. However, the range of a shape that can be processed by the shape of the tool used is more limited than the range before correction. Accordingly, the processing procedure data 320 is a procedure in which rough outer diameter turning is carried out in a shorter time in the processing preceding the processing unit definition data for the outer diameter turning before correction while leaving the processing unit definition data.

Figure 18:
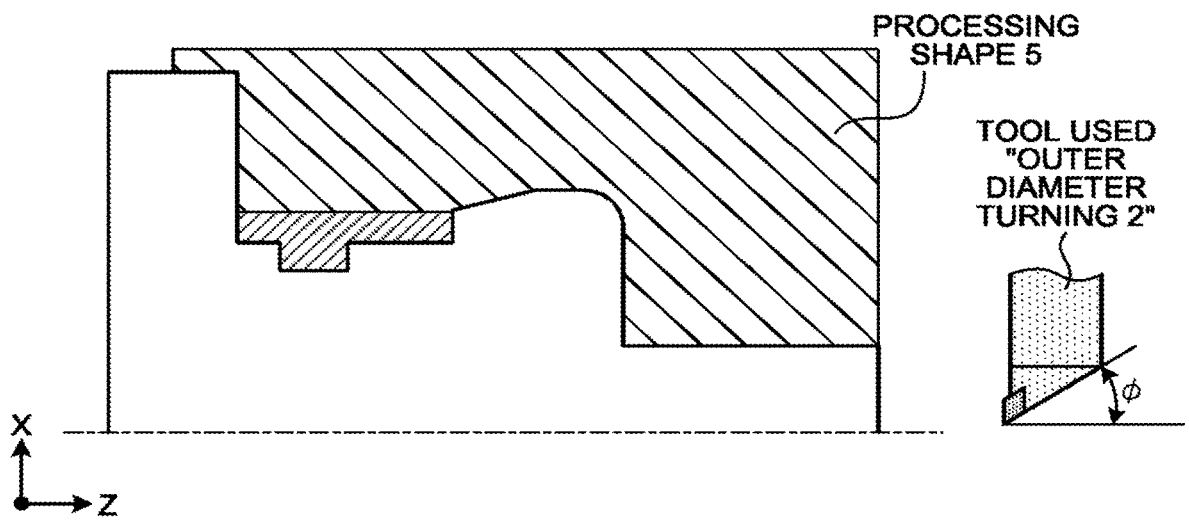
FIG. 18 is an image diagram of a processing shape extracted for processing unit definition data added to the processing procedure data by a processing step generation process in step 215.

FIG. 18 is an image diagram of a processing shape extracted in the processing step generation process of step 215 for the second processing unit definition data in the processing procedure data 320. The processing shape is extracted by the following procedure on the basis of the processing method "outer diameter turning (Z−)", a tool used "outer diameter turning 2", and an uncut condition "all uncut for the recess with uncut area" included in the processing unit definition data as well as the removed shape data.

According to the processing method "outer diameter turning (Z−)", recesses (R1, R2, and R3 in FIG. 11) that are recessed in the X− direction in an area shape of the removed shape corresponding to the X+ side relative to the area thereof corresponding to the product shape are extracted, and an area shape (R0 in FIG. 11) excluding the recesses in the area shape is extracted as a part of the processing shape. The lengths in the Z direction (w1, w2, and w3 in FIG. 11) are also calculated as the widths of the recesses. The orientation of the tool used "outer diameter turning 2" is set as illustrated in FIG. 18 since the processing is performed in the Z− direction.

According to the uncut condition "all uncut for the recess with uncut area", the recess (R1 in FIG. 11) that has no uncut area by the tool used "outer diameter turning 2" is extracted as a part of the processing shape, while the recess having an uncut area and the recess continuous therewith in the X− direction (R2 and R3 in FIG. 11) are all left uncut.

The shape of the sum of the area shapes extracted as a part of the processing shape is extracted as a processing shape (processing shape 5 in FIG. 18).

Figure 19:
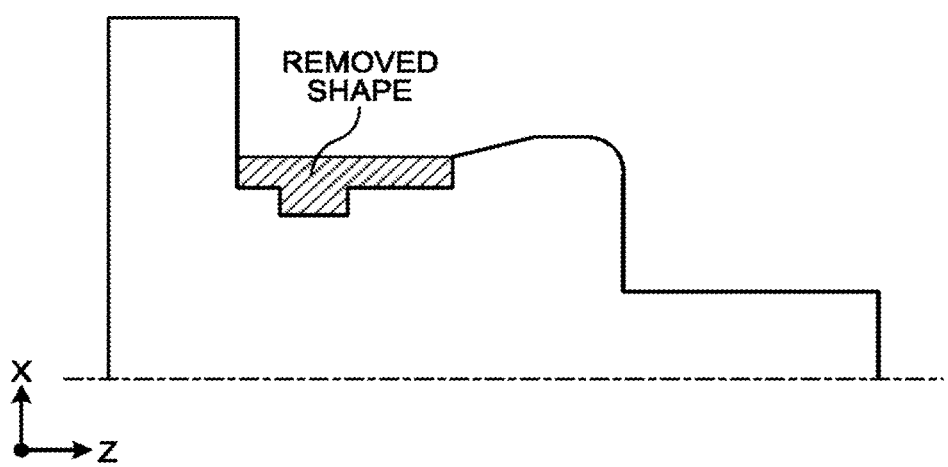
FIG. 19 is an image diagram of a removed shape obtained by removing the processing shape illustrated in FIG. 18.
Figure 20:
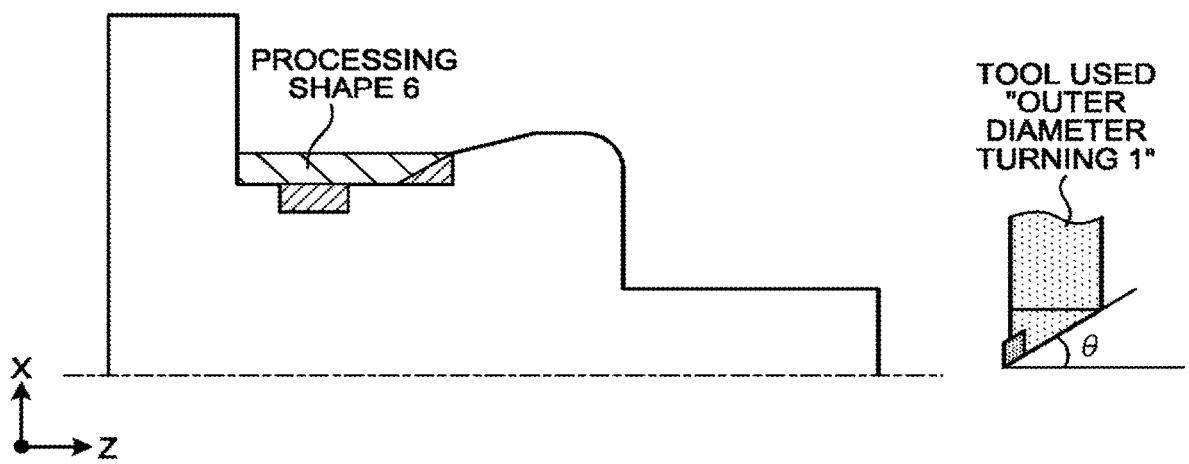
FIG. 20 is an image diagram of a processing shape extracted for the removed shape illustrated in FIG. 19.
Figure 21:
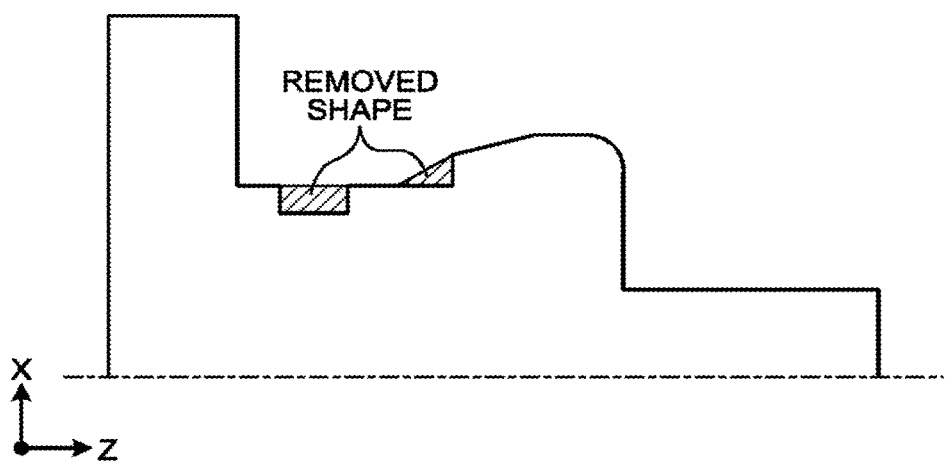
FIG. 21 is an image diagram of a removed shape obtained by removing the processing shape illustrated in FIG. 20.

FIG. 19 is an image diagram of a removed shape obtained by removing the processing shape illustrated in FIG. 18. FIG. 20 is an image diagram of a processing shape extracted for the third processing unit definition data in the processing procedure data 320. FIG. 21 is an image diagram of a removed shape obtained by removing the processing shape illustrated in FIG. 20.

A processing shape extracted for the fourth and subsequent processing unit definition data in the processing procedure data 320 is similar to that extracted for the third and subsequent processing unit definition data in the processing procedure data 300 before correction.

The process returns to step 212 after execution of step 213.

Step 216 checks for an operator's instruction to end the step generating operation and returns to the process of step 200 if the instruction to end the step generating operation is given (Yes in S216), or returns to the process of step 212 if the instruction to end the step generating operation is not given (No in S216).

Step 230 checks for an operator's instruction to register the processing procedure and executes the process of step 231 if the instruction to register the processing procedure is given (Yes in S230), or executes the process of step 240 if the instruction to register the processing procedure is not given (No in S230).

Step 231 updates the product and material data as well as the processing procedure name data in the processing procedure data on the basis of the processing procedure data stored in the applied processing procedure data storage unit 12, the product and material data stored in the product and material data storage unit 10, and the processing procedure name data input by an operator at the time of storage, thereby storing the updated processing procedure data into the processing procedure data group storage unit 11.

Step 240 checks for an operator's instruction to end the operation of the processing step data generating apparatus 100 and ends the operation of the processing step data generating apparatus 100 if the instruction to end the operation is given by the operator (Yes in S240), or returns to step 200 and continues the process if the instruction to end the operation is not given by the operator (No in S240).

Figure 23:
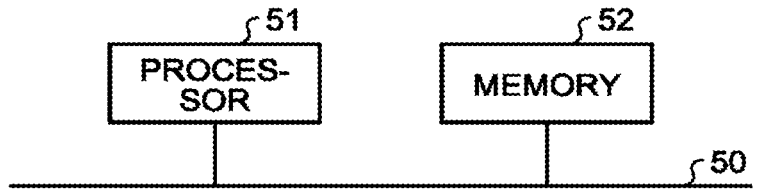
FIG. 23 is a diagram illustrating an example of a hardware configuration for implementing the processing step data generating apparatus.

A hardware configuration for implementing the processing step data generating apparatus 100 will be described. FIG. 23 is a diagram illustrating an example of the hardware configuration for implementing the processing step data generating apparatus 100. The processing step data generating apparatus 100 can be implemented by a processor 51 and a memory 52. The processor 51 and the memory 52 are connected to a bus 50 to mutually exchange data and information via the bus 50. The memory 52 stores a program in which a processing procedure of a function as the processing step data generating apparatus 100 is described. When the program is run, the processor 51 operates in accordance with the program stored in the memory 52.

The processing step generation unit 4 includes: the removed shape generating part 5 that generates the removed shape data which is the shape data of an area to be removed from the product and material shape data; the processing shape extracting part 6 that generates the processing shape data corresponding to a plurality of pieces of data that is relevant to partial processing and is included in the processing procedure data, generates data of a shape obtained by removing the processing shape from the removed shape on the basis of the processing shape data and the removed shape data, and updates the removed shape data with the data being generated; and the processing step constructing part 7 that generates processing step data from the processing shape data generated by the processing shape extracting part 6 and the data relevant to the partial processing in the processing procedure data corresponding to the processing shape data. Such a configuration can generate the processing step data necessary for removing the removed shape in accordance with the processing procedure data.

As described above, the processing step data generating apparatus 100 according to the present embodiment includes: the processing procedure data group storage unit 11 that stores the plurality of pieces of processing procedure data each including the data that includes the processing method, the data on the tool used, and the uncut condition data and defines the processing unit as well as the processing order data of the processing unit defined by the data defining the processing unit; the processing procedure selection unit 2 that selects processing procedure data to be applied to generate the processing step data from among the plurality of processing procedure data stored in the processing procedure data group storage unit 11; the processing step generation unit 4 that generates the removed shape data, which is the difference between the product shape and the material shape, on the basis of the product and material data to store the removed shape data in the removed shape data storage unit 13, extracts, for each processing unit definition data included in the processing procedure data selected by the processing procedure selection unit 2, the processing shape of the processing unit from the processing method, the data on the tool used, and the uncut condition data included in the processing unit definition data as well as the removed shape data stored in the removed shape data storage unit 13, updates the removed shape data in the removed shape data storage unit 13 by generating the data of a shape obtained by removing the processing shape from the removed shape on the basis of the processing shape data being extracted and the removed shape data, generates the processing unit data from the processing shape data being extracted and the corresponding processing unit definition data, and generates the processing step data from the processing unit data being generated; and the processing procedure registration unit 8 that stores the processing procedure data selected by the processing procedure selection unit 2 in the processing procedure data group storage unit 11. According to the processing step data generating apparatus 100, the processing shape data of the processing unit is extracted from the processing method, the data on the tool used, and the uncut condition data included in the processing unit definition data as well as the removed shape data, so that the processing shape data that is properly processed by the tool used from the removed shape in various states can be obtained to be able to generate the processing step data on the basis of the processing shape data. Thus, by reflecting the know-how of an operator in the processing procedure data, the processing step data of processing for various combinations of the product shape and the material shape can be generated on the basis of the processing procedure data adjusted on the basis of the processing know-how, whereby the processing step data reflecting the processing know-how can be obtained without trouble.

The processing step data generating apparatus 100 further includes: the applied processing procedure data storage unit 12 that stores the processing procedure data selected by the processing procedure selection unit 2; and the processing procedure correction unit 3 that corrects the processing procedure data stored in the applied processing procedure data storage unit 12 and updates the data in the applied processing procedure data storage unit 12 with the processing procedure data being corrected. Such a configuration can correct the processing procedure data for obtaining the processing step data that enables more appropriate processing depending on various situations. The processing procedure data being corrected can be stored and reused to thus require a small amount of correction in generating processing step data for processing a similar product and be able to increase the production efficiency. Moreover, the processing procedure can call another processing procedure so that a new processing procedure can be efficiently constructed from the existing processing procedure.

The processing procedure selection unit 2 displays, on the display, both a piece of data included in each of the plurality of processing procedure data stored in the processing procedure data group storage unit 11 and a value calculated from the data included in each of the plurality of processing procedure data, or displays one of the data and the value on the display, thereby selecting the processing procedure data instructed from outside. This supports selection of the processing procedure data since the data and/or the calculated value relevant to the processing procedure data are/is displayed at the time of the selection.

The processing procedure data includes the arbitrary name data, and the processing procedure registration unit 8 includes the name data given by an external input in the processing procedure data and stores the data in the processing procedure data group storage unit 11. Such a configuration can increase the efficiency of selecting the processing procedure with the use of the name data included in the processing procedure data.

The processing procedure data includes the product and material data, and the processing procedure selection unit 2 displays, on the display, corresponding data between the product and material data for which the processing step data is generated and the product and material data included in the processing procedure data, or a corresponding value calculated from the data. Such a configuration can support selection of the processing procedure data effective for the product shape.

The processing procedure data includes the product and material data, and the processing procedure selection unit 2 displays, on the display, both a piece of data included in each of the plurality of processing procedure data stored in the processing procedure data group storage unit 11 and a value calculated from the data included in each of the plurality of processing procedure data, or displays one of the data and the value on the display in the order determined on the basis of product material data for which the processing step data is generated as well as the product and material data included in the processing procedure data. Such a configuration can support selection of the processing procedure data effective for the product shape.

The processing procedure data further includes, as data on the product, data on each of the length in the central axis direction and the length in the radial direction of the cylindrical shape containing the product shape. This facilitates selection of the processing procedure data for the product having a shaft shape.

The processing step data generating method according to the present embodiment includes: a storage step of storing the plurality of pieces of processing procedure data each including the data that includes the processing method, the data on the tool used, and the uncut condition data and defines the processing unit as well as the processing order data of the processing unit defined by the data defining the processing unit; a selection step of selecting processing procedure data to be applied to generate the processing step data from among the plurality of processing procedure data stored in the storage step; a generation step of generating and storing the removed shape data, which is the difference between the product shape and the material shape, on the basis of the product and material data, extracting, for each processing unit definition data included in the processing procedure data selected in the selection step, the processing shape data of the processing unit from the processing method, the data on the tool used, and the uncut condition data included in the processing unit definition data as well as the removed shape data being stored, updating the removed shape data being stored by generating the data of a shape obtained by removing the processing shape from the removed shape on the basis of the processing shape data being extracted and the removed shape data being stored, generating the processing unit data from the processing shape data being extracted and the corresponding processing unit definition data, and generating the processing step data from the processing unit data being generated; and a step of storing the processing procedure data selected in the selection step as the processing procedure data where the data is selected. The processing step data generating method of the present embodiment stores in advance the processing procedure data adjusted on the basis of the processing know-how, and generates the processing step data in accordance with the processing procedure data being selected. Therefore, the processing step data reflecting the processing know-how can be obtained without trouble.

The configuration illustrated in the above embodiment merely illustrates an example of the content of the present invention, and can thus be combined with another known technique or partially omitted and/or modified without departing from the scope of the present invention.

REFERENCE SIGNS LIST

1 product and material data input unit; 2 processing procedure selection unit; 3 processing procedure correction unit; 4 processing step generation unit; 5 removed shape generating part; 6 processing shape extracting part; 7 processing step constructing part; 8 processing procedure registration unit; 10 product and material data storage unit; 11 processing procedure data group storage unit; 12 applied processing procedure data storage unit; 13 removed shape data storage unit; 15 processing step data storage unit; 50 bus; 51 processor; 52 memory; 100 processing step data generating apparatus; 300, 310, 320 processing procedure data; 400 processing procedure list.

The invention claimed is:

1. A processing step data generating apparatus that generates processing step data for removal processing in which a product is obtained from a material on the basis of product material data including shape data that represents the shape of each of the product and the material, the apparatus comprising:
   a processing procedure data group memory that stores a plurality of pieces of processing procedure data each including data that defines a processing unit, which is a unit of a processing step, as well as processing order data of the processing unit defined by the data defining the processing unit, the data defining the processing unit including a processing method, data on a tool used, and uncut condition data;
   a processing procedure selector that selects processing procedure data to be applied when a processing step generator generates processing step data from among the plurality of pieces of processing procedure data stored in the processing procedure data group memory;
   a removed shape data memory that stores removed shape data representing the shape of an area to be removed from the material;

the processing step generator that extracts the data defining the processing unit in the processing procedure data selected by the processing procedure selector in the order according to the processing order data of the processing unit defined by the data defining the processing unit, and generates processing shape data of the processing unit from a processing method, data on a tool used, and uncut condition data included in the data defining the processing unit being extracted as well as the removed shape data being removed, and generates processing unit data from the data defining the processing unit being extracted and the processing shape data generated on the basis of the data defining the processing unit, and generates processing step data on the basis of the processing unit data being generated;

an applied processing procedure data memory that stores the processing procedure data selected by the processing procedure selector; and a processing procedure corrector that corrects the processing procedure data stored in the applied processing procedure data memory by correcting, adding, and/or deleting data defining an individual processing unit in accordance with an instruction from an operator, and updates data in the applied processing procedure data memory with the processing procedure data being corrected, wherein the processing step generator generates the processing step data on the basis of the processing procedure data stored in the applied processing procedure data memory, wherein the uncut condition data, included in data defined in a respective processing unit, defines a condition which designates an area to remain uncut by defining a condition from a group of conditions which includes at least a condition which minimizes an area to remain uncut, among a remaining shape of an area to be removed from the material, and a condition which designates an area to remain uncut in a recess in accordance with the recess width, in the respective processing unit based on the data on the tool used.

2. The processing step data generating apparatus according to claim 1, wherein the processing procedure selector displays both or one of data included in each of the plurality of pieces of processing procedure data stored in the processing procedure data group memory and a value calculated from the data included in each of the plurality of pieces of processing procedure data, thereby selecting the processing procedure data instructed from outside.

3. The processing step data generating apparatus according to claim 2, wherein the processing procedure data includes product material data, and the processing procedure selector displays both or one of corresponding data between product material data for which the processing step data is generated and the product material data included in the processing procedure data, and a corresponding value calculated from the data.

4. The processing step data generating apparatus according to claim 3, wherein the processing procedure data includes, as the product material data, data on each of the length in a central axis direction and the length in a radial direction of a cylindrical shape containing a product shape.

5. The processing step data generating apparatus according to claim 2, wherein the processing procedure data includes product material data, and the processing procedure selector displays both or one of (i) data included in each of the plurality of pieces of processing procedure data stored in the processing procedure data group memory and a (ii) value calculated from the data included in each of the plurality of pieces of processing procedure data in the order that is determined on the basis of: product material data for which the processing step data is generated and the product material data included in the processing procedure data.

6. The processing step data generating apparatus according to claim 5, wherein the processing procedure data includes, as the product material data, data on each of the length in a central axis direction and the length in a radial direction of a cylindrical shape containing a product shape.

7. The processing step data generating apparatus according to claim 1, further comprising a processing procedure register that stores the processing procedure data stored in the applied processing procedure data memory into the processing procedure data group memory.

8. The processing step data generating apparatus according to claim 7, wherein the processing procedure data includes arbitrary name data, and the processing procedure register includes name data given by an external input in the processing procedure data and stores the data in the processing procedure data group memory.

9. The processing step data generating apparatus according to claim 1, wherein the group of conditions further includes a condition which remains all uncut for the recess, the recess being a shape of an area to be removed from the material, in the respective processing unit based on the data on the tool used.

10. The processing step data generating apparatus according to claim 1, wherein the group of conditions further includes a condition which minimizes an area to remain uncut in a recess in accordance with the size of the recess, and a condition which remains all uncut for the recess, the recess being a shape of an area to be removed from the material, in the respective processing unit based on the data on the tool used.

11. A processing step data generating apparatus that generates processing step data for removal processing in which a product is obtained from a material on the basis of product material data including shape data that represents the shape of each of the product and the material, the apparatus comprising:

a processing procedure data group memory that stores a plurality of pieces of processing procedure data each including data that defines a processing unit, which is a unit of a processing step, as well as processing order data of the processing unit defined by the data defining the processing unit, the data defining the processing unit including a processing method, data on a tool used, and uncut condition data;

a processing procedure selector that selects processing procedure data to be applied to generate the processing step data from among the plurality of pieces of processing procedure data stored in the processing procedure data group memory;

a removed shape data memory that stores removed shape data representing the shape of an area to be removed from the material; and a processing step generator that
generates the removed shape data from the shape data and stores the removed shape data in the removed shape data memory,
extracts the data defining the processing unit included in the processing procedure data selected by the processing procedure selector in the order according to the processing order data of the processing unit defined by the data defining the processing unit, and generates processing shape data of the processing unit from a processing method, data on a tool used, and uncut condition data included in the data defining the processing unit being extracted as well as the removed shape data stored in the removed shape data memory,
generates data of a shape obtained by removing a processing shape from a removed shape on the basis of the processing shape data being generated and the removed shape data stored in the removed shape data memory, and updates data in the removed shape data memory with the data being generated, and
generates processing unit data from the data defining the processing unit being extracted and the processing shape data generated on the basis of the data defining the processing unit,
generates processing step data on the basis of the processing unit data generated for the data defining the processing unit included in the processing procedure data selected by the processing procedure selector;
an applied processing procedure data memory that stores the processing procedure data selected by the processing procedure selector; and
a processing procedure corrector that corrects the processing procedure data stored in the applied processing procedure data memory by correcting, adding, and/or deleting data defining an individual processing unit in accordance with an instruction from an operator, and updates data in the applied processing procedure data memory with the processing procedure data being corrected, wherein
the processing step generator generates the processing step data on the basis of the processing procedure data stored in the applied processing procedure data memory,
wherein the uncut condition data, included in data defined in a respective processing unit, defines a condition which designates an area to remain uncut by defining a condition from a group of conditions which includes at least a condition which minimizes an area to remain uncut, among a remaining shape of an area to be removed from the material, and a condition which designates an area to remain uncut in a recess in accordance with the recess width, in the respective processing unit based on the data on the tool used.

12. The processing step data generating apparatus according to claim 11, wherein the processing procedure selector displays both or one of data included in each of the plurality of pieces of processing procedure data stored in the processing procedure data group memory and a value calculated from the data included in each of the plurality of processing procedure data, thereby selecting the processing procedure data instructed from outside.

13. The processing step data generating apparatus according to claim 12, wherein
the processing procedure data includes product material data, and
the processing procedure selector displays both or one of corresponding data between product material data for which the processing step data is generated and the product material data included in the processing procedure data, and a corresponding value calculated from the data.

14. The processing step data generating apparatus according to claim 13, wherein the processing procedure data includes, as the product material data, data on each of the length in a central axis direction and the length in a radial direction of a cylindrical shape containing a product shape.

15. The processing step data generating apparatus according to claim 12, wherein
the processing procedure data includes product material data, and
the processing procedure selector displays both or one of (i) data included in each of the plurality of pieces of processing procedure data stored in the processing procedure data group memory and (ii) a value calculated from the data included in each of the plurality of pieces of processing procedure data in the order that is determined on the basis of: product material data for which the processing step data is generated and the product material data included in the processing procedure data.

16. The processing step data generating apparatus according to claim 15, wherein the processing procedure data includes, as the product material data, data on each of the length in a central axis direction and the length in a radial direction of a cylindrical shape containing a product shape.

17. The processing step data generating apparatus according to claim 11, further comprising a processing procedure register that stores the processing procedure data stored in the applied processing procedure data memory into the processing procedure data group memory.

18. The processing step data generating apparatus according to claim 17, wherein the processing procedure data includes arbitrary name data, and
the processing procedure register includes name data given by an external input in the processing procedure data and stores the data in the processing procedure data group memory.

19. A processing step data generating method executed by a processing step data generating apparatus that generates processing step data for removal processing in which a product is obtained from a material on the basis of product material data including shape data that represents the shape of each of the product and the material, the method comprising:
storing a plurality of pieces of processing procedure data each including data that defines a processing unit, which is a unit of a processing step, as well as processing order data of the processing unit defined by the data defining the processing unit, the data defining the processing unit including a processing method, data on a tool used, and uncut condition data;
selecting processing procedure data to be applied to generate the processing step data from among the plurality of pieces of stored processing procedure data;
generating processing step data on the basis of processing unit data by
storing removed shape data that is shape data of an area to be removed from the material; extracting the data defining the processing unit included in the selected processing procedure data in the order according to the processing order data of the processing unit defined by the data defining the processing unit, and generating processing shape data of the processing unit from a processing method, data on a tool used, and uncut condition data included in the data defining the processing unit being extracted as well as the removed shape data being stored; and generating the processing unit data from the data defining the processing unit being extracted and the processing shape data generated on the basis of the data defining the processing unit;

storing, in an applied processing procedure data memory, the selected processing procedure data;

correcting the processing procedure data stored in the applied processing procedure data memory by correcting, adding, and/or deleting data defining an individual processing unit in accordance with an instruction from an operator, and updating data in the applied processing procedure data memory with the processing procedure data being corrected; and generating the processing step data on the basis of the processing procedure data stored in the applied processing procedure data memory, wherein the uncut condition data, included in data defined in a respective processing unit, defines a condition which designates an area to remain uncut by defining a condition from a group of conditions which includes at least a condition which minimizes an area to remain uncut, among a remaining shape of an area to be removed from the material, and a condition which designates an area to remain uncut in a recess in accordance with the recess width, in the respective processing unit based on the data on the tool used.

* * * * *